May 7, 1935. F. D. MILLER ET AL 2,000,089

HAND BRAKE MECHANISM

Filed April 3, 1933 3 Sheets-Sheet 1

Frank D. Miller
Everard C. Mersereau INVENTORS

BY Popp & Powers
ATTORNEYS.

May 7, 1935.  F. D. MILLER ET AL  2,000,089
HAND BRAKE MECHANISM
Filed April 3, 1933   3 Sheets-Sheet 2
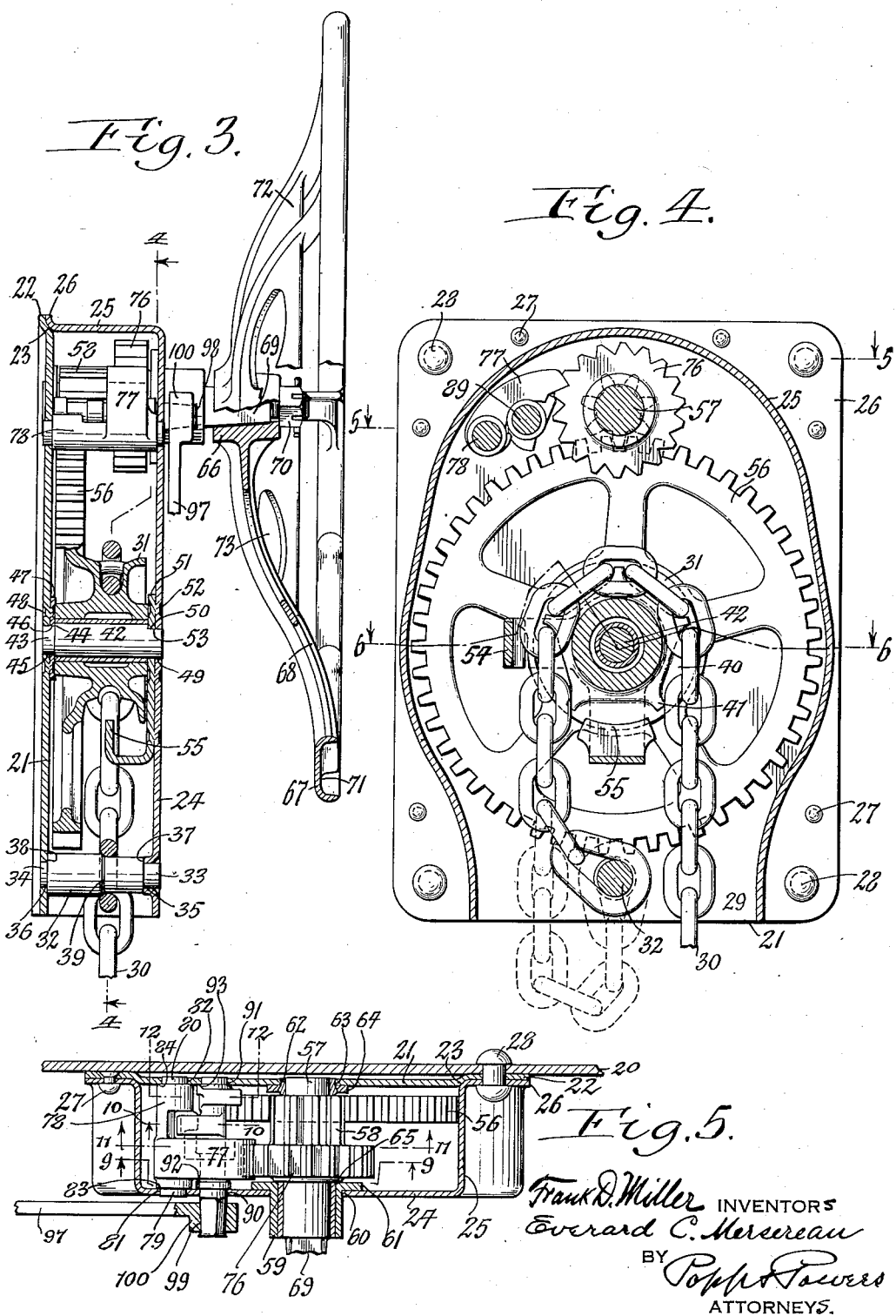
Frank D. Miller
Everard C. Mersereau INVENTORS
BY Popp & Powers
ATTORNEYS.

May 7, 1935.   F. D. MILLER ET AL   2,000,089
HAND BRAKE MECHANISM
Filed April 3, 1933   3 Sheets-Sheet 3

Frank D. Miller
Everard C. Mersereau   INVENTORS
BY Popp & Powers
ATTORNEYS

Patented May 7, 1935

2,000,089

UNITED STATES PATENT OFFICE 2,000,089

HAND BRAKE MECHANISM

Frank D. Miller and Everard C. Mersereau, Buffalo, N. Y., assignors to National Brake Company, Inc., Buffalo, N. Y., a corporation of New York Application April 3, 1933, Serial No. 664,096

1 Claim. (Cl. 188—81.1)

This invention relates to a hand brake mechanism of the type in which the power for operating the brakes is applied by the brakeman through the movement of his hands in a vertical plane while the brakeman is standing on a platform or other horizontal supporting surface adjacent to the brake mechanism and facing the end of the car on which the brake rigging is mounted.

In brake mechanisms of this character as heretofore constructed the housing enclosing some of the operating mechanism, when constructed of metal, was liable to be distorted when mounted on the end wall of the car, particularly when this end wall was more or less uneven and thereby produce a cramping or binding effect on the movable parts which interfered with the freedom of action of these moving parts, and thereby reduce the efficiency of the brake mechanism accordingly. In these prior hand brakes the hand wheel was also usually so constructed that the grip of the hand on the rim of the wheel was not secure but would slip and the brakeman would therefore take hold of the spokes of the wheel for improving his grip, but this is objectionable inasmuch as it reduces the leverage and power with which the brakes are applied.

Another disadvantage inherent in these earlier hand brakes is that the mechanism for disengaging the detent pawl from the ratchet wheel for the purpose of releasing the brake mechanism was so organized that the trip lever forming part of this mechanism was liable to be thrown unduly and thereby produce an unlocking or releasing action; and this lever was also so located while the brake mechanism was in an applied position that the shock to which the car was subjected while coupling the same with another car was liable to throw the trip lever from its brake applied position to its brake release position and thereby release the brake mechanism and possibly cause accidents.

It is the object of this invention to provide a brake mechanism of this character which avoids the objections above enumerated and also to improve the brake mechanism in various details of construction, and not only render the same stronger, more durable and more efficient in operation, but also to permit the same to be produced with greater economy and enable certain parts to be made either of cast steel or drop forgings to suit the demands of the trade or the particular installation where they are to be used.

In the accompanying drawings:

Figure 3 is a vertical longitudinal section of our improved hand brake mechanism, taken on line 3—3 Fig. 1, but showing the adjacent end wall of the car omitted.

Figure 4 is a vertical cross section, taken on line 4—4 Fig. 3.

Figures 5 and 6 are horizontal sections, taken on the correspondingly numbered lines in Fig. 4.

Figure 9:
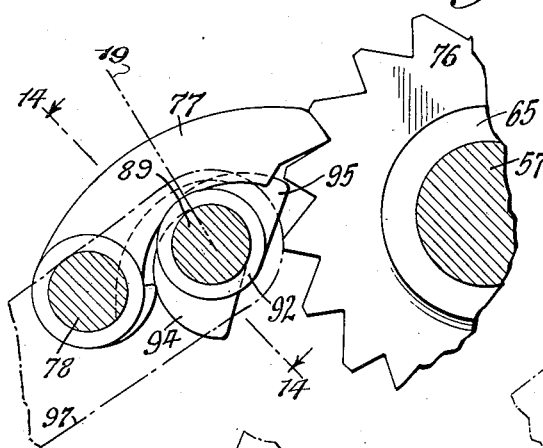
Figure 9 is a fragmentary vertical section, on an enlarged scale, taken on line 9—9 Fig. 5.
Figure 10:
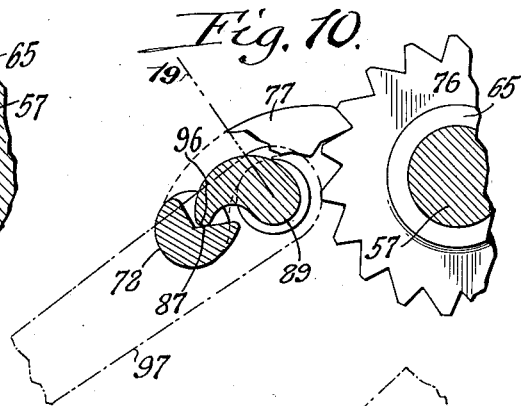
Figure 11:
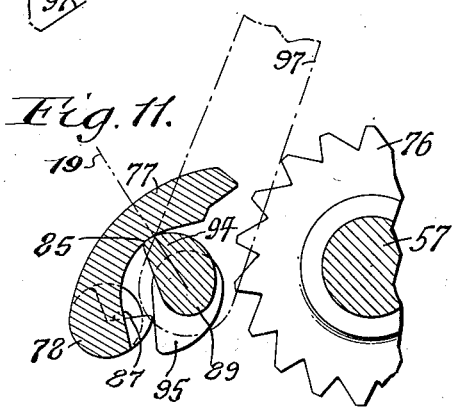
Figure 12:
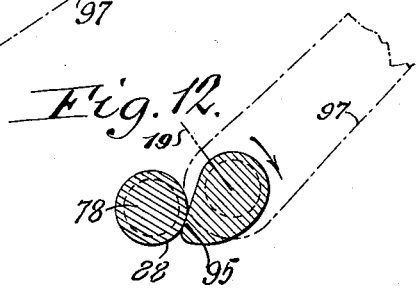

Figures 10, 11 and 12 are fragmentary vertical sections, taken respectively on lines 10—10, 11—11 and 12—12 in Fig. 5, but showing the parts on a scale between that of Fig. 5 and Fig. 9.

Figure 13:
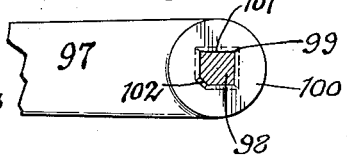

Figure 13 is a fragmentary side elevation of the hub end of the trip lever showing the same detached from the remaining part of the brake mechanism.

Figure 14:
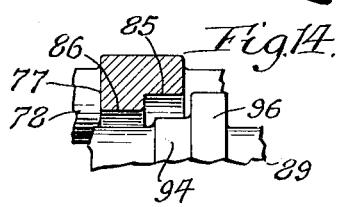

Figure 14 is a fragmentary section, taken on line 14—14 Fig. 9.

The numeral 20 represents the upright transverse end wall of the body of a railway car, which wall may be of any suitable construction and made either of wood as in the past, or the same may be made of plain or corrugated sheet metal as is more commonly the case in cars of modern construction.

In its general organization this brake mechanism comprises a housing which encloses most of the movable parts of the brake mechanism, a chain mechanism which includes a chain having one end connected with the brake rigging of the car and a drum over which the chain is passed for tightening or relaxing the chain, means for turning the drum in either direction, a detent mechanism for holding the drum against backward rotation, and a trip mechanism for rendering the detent mechanism inoperative and also to restore the operation of the same.

Figure 6:
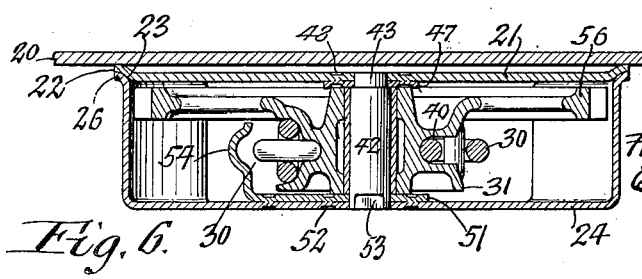

The housing or enclosing casing comprises front and rear sections which are formed of sheet metal, as shown in the drawings, although the same may be otherwise constructed, and which are secured to each other and to the end wall of the railway car body. The rear section of the housing has a comparatively flat central part 21 which is arranged vertically and transversely and forms the rear wall of the housing, and a marginal flange 22 arranged at the opposite upright edges and upper transverse edge of the rear wall 21, and offset rearwardly therefrom so as to form laterally facing shoulders 23 on the front side of this housing section, as shown in Figs. 3, 5 and 6.

The front section of the housing has an upright transverse front wall 24, a longitudinal side wall 25 extending rearwardly from the side and upper edges of the front wall 24, and a marginal flange 26 extending laterally outward from the rear edge of the side wall 25. In assembling the front and rear sections of the housing the corner of the front section at the junction of the side wall 25 and flange 26 fits around the shoulder 23 on the rear housing section, and the flange 26 of the front section engages with the front side of the flange 22 on the rear section, as shown in Figs. 3, 5 and 6, thereby accurately alining these two sections of the housing relatively to each other and supporting the parts which are mounted thereon in their proper relative position.

Figure 1:
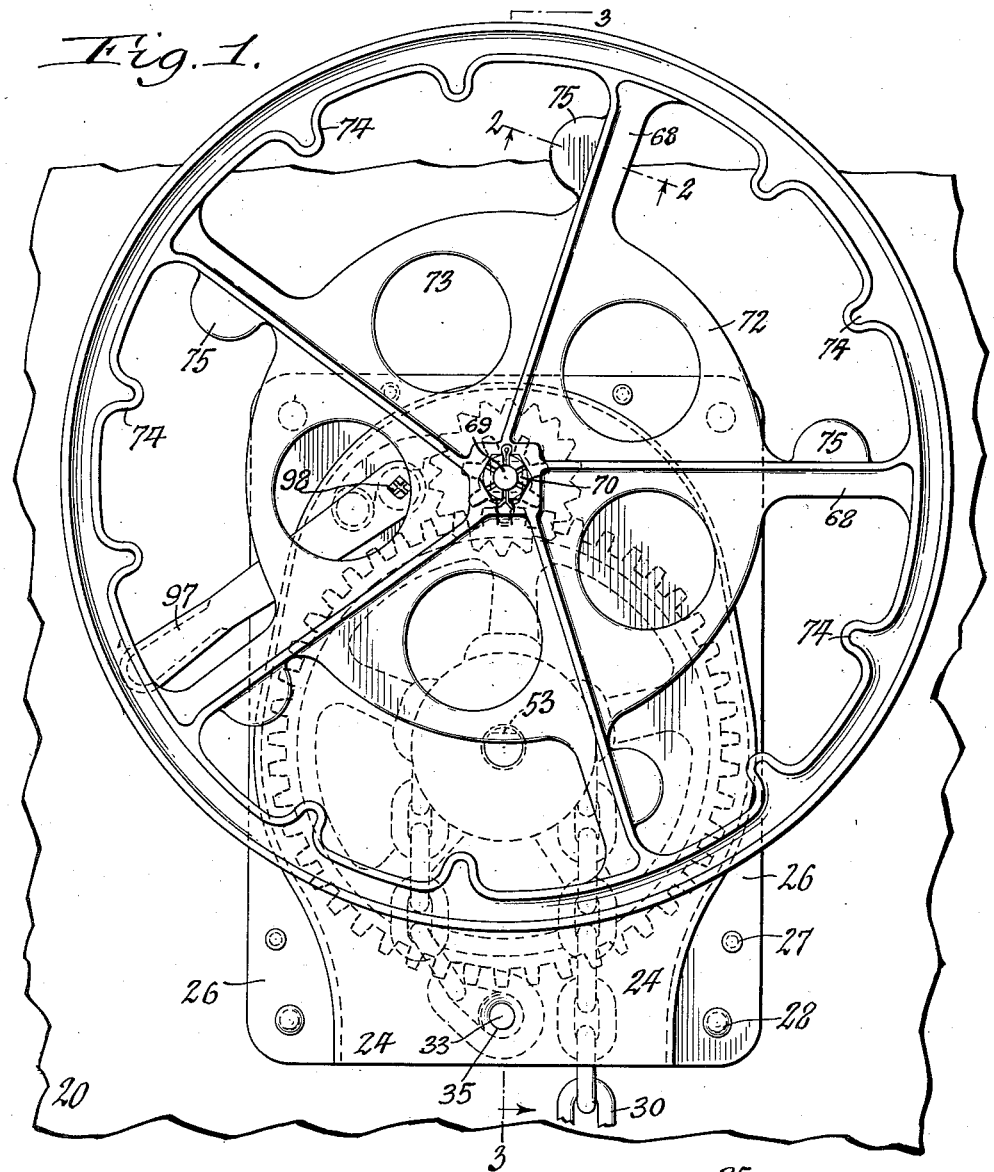
Figure 1 is a front elevation of a hand brake mechanism for railway cars embodying our improvements.

The two sections of the housing may be fastened together in any suitable manner but preferably by means of a plurality of rivets 27 which only pass through the flanges 22 and 26 of the housing sections at appropriate points, as shown in Figs. 1 and 4 and at the left in Fig. 5.

The housing together with the brake mechanism mounted thereon may be secured to the end wall of the car by various fastening means, but when this brake mechanism is used on railway cars having sheet metal bodies, this fastening preferably consists of a plurality of rivets 28 passing through the flanges 22 and 26 of the housing section and through the adjacent part of the sheet metal wall of the car body, as shown in Figs. 1 and 4 and at the right in Fig. 5.

By thus offsetting the marginal flange 22 of the rear housing section rearwardly from the central part or wall 21 thereof, any parts which are mounted on this rear wall of the housing are held out of contact with the end wall of the car and thus prevent the exertion of any pressure against any parts which are mounted on the casing. As a result of this construction the adjacent wall of a railway car at no time bears or exerts any pressure against any of the operating parts of the brake mechanism, and therefore does not interfere with the mounting of this housing on the car end wall regardless of whether the same is even or uneven, nor can there be any interference with any of the moving parts mounted in the housing such as the rocking or rotating shafts which will be hereinafter described, thereby insuring the proper operation of the movable elements of the brake mechanism at all times.

By offsetting the flange 22 on the marginal part of the rear housing section relative to the central part 21 which forms the rear wall of the housing, the housing only engages with the car wall along the edge portion of the housing which renders it possible to attach this housing to the end wall without interference due to any unevenness which may exist on the car wall, and when the laterally projecting flanges 22 and 26 of the housing sections are fastened to the car wall by means of the rivets 28 or other means, it is possible for these flanges to bend more or less and adapt themselves to any irregular or uneven surface with which they may engage without distorting the front and rear walls of the housing relatively to each other.

Owing to this flexibility of the housing flanges the bearings and other supporting members which are mounted on the front and rear walls of the housing and which carry different parts of the mechanism are maintained in accurate alinement with each other which is particularly important in the case of the moving parts such as the shafts which rotate in bearings on the front and rear walls of the housing, and which due to the absence of any distortion on the walls of the housing, will not be shifted out of alinement, and the parts journaled therein are therefore not liable to bind or cramp nor be interfered with in their normal operation as would otherwise be the case.

When the housing sections are thus assembled an opening 29 is formed between the lower ends of the front, rear and side walls of the housing, which opening affords a passageway for a part of the actuating mechanism of the brake rigging. This actuating mechanism in the present case includes a chain 30 which passes vertically through the housing opening 29 and has its lower end connected with the brake rigging in any suitable and well-known manner, while the upper part of the chain passes in the form of a loop over a brake drum or wheel 31 arranged within the housing, and the upper end link of the chain is anchored upon the lower part of the housing by means of an anchor pin 32. This anchor pin is arranged horizontally and lengthwise and has its front and rear ends 33, 34 contracted and arranged in alined openings 35, 36 in the lower parts of the front and rear walls of the housing. The contracted front and rear ends 33, 34 of the anchor pin form forwardly and rearwardly facing shoulders 37 and 38 thereon, which shoulders engage with the inner sides of the front and rear housing walls, and this pin is thus held reliably in place between these walls after these members are assembled. These walls are also held in the properly spaced relation so that the opening or passageway 29 of the chain will not become restricted due to any bending of the lower parts of the housing walls relatively to each other, and thereby insure freedom of movement of the chain at all times.

The anchoring pin is also provided about midway of its length with a forwardly facing annular shoulder 39 which is adapted to be engaged by the upper end-most link of the brake chain which embraces this pin and thereby prevent this particular link and the adjacent part of the chain from moving rearwardly in the housing and interfering with other parts of the brake mechanism which are arranged within the casing.

The brake drum or chain wheel 31 is provided with the usual pockets and teeth 40, 41 on its periphery for engagement with the links of the brake chain so as to interlock this wheel and chain and compel the same to move positively with each other upon rotating the drum. This drum is journaled on an axle 42 which is arranged lengthwise and horizontally within the central part of the housing and has a reduced rear end 43 forming a rearwardly facing shoulder 44. This reduced end 43 is seated in alined openings 45, 46 formed respectively in the rear wall 21 of the housing, and a reinforcing member 47 preferably of disk form which is secured to the inner side of the rear wall by spot welding 48, as shown in Figs. 3 and 6, or other suitable means.

The front end of the wheel axle 42 passes through alined openings 49, 50 formed respectively in the front wall of the housing, and a reinforcing member 51 having preferably the form of an eye which is secured to the inner side of the front housing wall by means of spot welding 52, as shown in Figs. 3 and 6. Turning of the axle 42 is prevented by providing its front end with a flat face 53 on one part only of its periphery, as shown in Figs. 1, 3 and 6, and making the openings 49 and 50 in the front wall and reinforcing member 51 of corresponding form, thereby causing the axle and the housing to be interlocked and hold the axle against rotation.

During the operation of this hand brake mechanism the brake drum 31 is turned anti-clockwise when viewing the same from the front side, as shown in Fig. 4, whereby the lower part of the chain is pulled upwardly and the brake rigging is operated for applying the brake shoes to the rotating wheels of the cars, and during this time the upper idle part of the chain which has passed over the top of the drum passes downwardly therefrom and hangs in the form of a loop between the drum and the anchoring pin 38, as shown by dotted lines in Fig. 4. During the releasing action of the brake mechanism the drum 31 turns in a clockwise direction, during which time part of the chain passes from the drum downwardly through the opening 29 of the housing and more or less of the slack of the loop in the chain is taken out between the drum and the anchoring pin 32, but when the length of the chain has been exhausted further rotation of the drum in a clockwise direction is arrested and movement of the chain in that direction is stopped due to the fastening of the upper end of the brake chain to the housing by means of the anchoring pin 32.

Controlling means are provided within the housing which guide the slack part of the brake chain and hold the same in operating position on the drum, and also stripping means which operate to forcibly disengage the slack part of the chain from the drum in case there is any tendency for such part of the chain to stick to the drum and thereby insure proper operation of the brake mechanism. The guide means preferably consist of a hook 54 arranged adjacent to the outer side of the slack portion of the chain horizontally in line with the axis of the drum and are preferably formed integrally with the adjacent front reinforcing member 51, as shown in Figs. 4 and 6. If the slack part of the chain in passing upwardly on the left hand side of the drum should tend to climb on to either edge of the drum, such tendency would be prevented by the guide hook 54, which latter would be engaged by the ascending part of the chain and thereby forced into proper engagement with the alternating pockets and teeth of the brake drum so as to insure normal operation of the mechanism. If the slack part of the chain while descending with the drum on the left hand side thereof during an application of the brake rigging should tend to cling to the teeth and pockets of the drum, then the links of the chain would engage with a stripper 55 arranged in the path of the chain below the axis of the drum and thereby be forcibly disengaged from the latter. This stripper 55 is also preferably formed integrally with the adjacent part of the reinforcing member or eye 51 on the front wall of the housing, as shown in Figs. 3 and 4.

By thus making the reinforcing member 51, the guide 54 and the stripper 55 in the form of an integral bracket, and securing the same by spot welding, either electrical or otherwise, with the front wall of the housing, this part of the brake mechanism is materially simplified and rendered stronger and more economical in construction compared with the means heretofore employed for this purpose and also insures against the apparatus getting out of order.

The means for turning the drum in either direction are preferably constructed as follows:

The numeral 56 represents a gear wheel of comparatively large diameter arranged in the rear part of the housing and connected with the rear part of the chain drum 31, this connection being preferably effected by forming this gear wheel and drum in one piece, as best shown in Figs. 1, 3 and 6.

The numeral 57 represents a driving shaft arranged in the upper part of the housing and turning about a horizontal longitudinal axis, and provided on its rear part with a gear pinion 58 of comparatively small diameter which meshes with the upper part of the gear wheel 56, as shown in Figs. 1, 4 and 5. The front part of this driving shaft is journaled in a bearing formed in a sleeve 59 which is arranged in an opening 60 in the front wall of the housing and provided at its inner end with a reinforcing member or flange 61 which is secured by electric spot welding or otherwise to the inner side of the front wall of the housing, as shown in Fig. 5. The rear end of the driving shaft is journaled in a bearing formed within a bushing 62 which is secured within an opening 63 in the rear wall of the housing and also in a reinforcing member or ring 64 secured by spot welding or otherwise to the inner side of the rear wall of the housing, as shown in Fig. 5.

The longitudinal movement of the driving shaft 57 in its bearings is prevented by the rear end of the pinion 58 which forms a shoulder for engagement with the front end of the bearing bushing 62 and by means of a forwardly facing shoulder 65 formed on the front part of the driving shaft and engaging with the rear side of the bearing sleeve 60.

Figure 2:
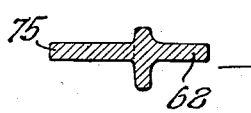
Figure 2 is a fragmentary section, on an enlarged scale, taken on line 2—2 Fig. 1.
Figure 7:
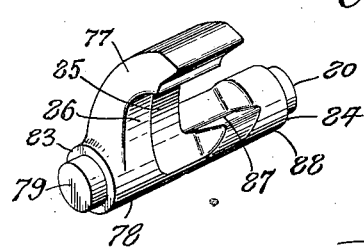
Figures 7 and 8 are perspective views, respectively, of the detent pawl shaft and the parts mounted thereon, and the trip lever shaft and the parts mounted thereon.
Figure 8:
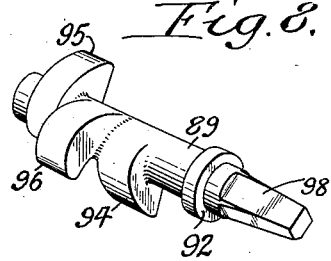

On its front end the driving shaft is provided with a hand wheel for turning this shaft in either direction and operating the parts associated therewith. This hand wheel, as best shown in Figs. 1, 2 and 3, comprises a central hub 66, a rim 67 arranged concentrically around the hub, and a plurality of radial spokes or arms 68 connecting the hub and rim. Although various means may be employed for securing this wheel to the driving shaft this is preferably effected by the means which are shown in the drawings and which consist of a square forwardly tapering shank 69 formed on the front end of the driving shaft and fitting in a correspondingly shaped bore of the hub 66, and a screw nut 70 applied to the front end of the shank for engaging with the front end of said hub.

As shown in Figs. 1 and 3 the rim 67 of the hand wheel is of channel shaped form and has its hollow or concave side 71 facing forwardly, thereby producing a rim which is very light and strong but presents smooth and even peripheral surfaces on the inner and outer edges thereof for engagement by the hands of the brakeman for operating the braking mechanism.

In order to prevent the brakeman from introducing a club through the space between the spokes, hub and rim of the wheel for the purpose of obtaining a greater purchase for operating the brake mechanism, a guard web or disk 72 is formed around the hub and between the several spokes of the hand wheel and extending radially outward a sufficient distance to prevent introduction of a club into the spaces between the arms in such a way that this club could be used to increase the leverage of the hand wheel. This guard web is provided with a plurality of openings 73 in order to reduce the weight of the hand wheel as a whole.

In order to enable the brakeman to obtain a firm hold on the rim of the wheel and effectively turn the same in either direction while applying or releasing the brake mechanism the inner side of this rim is provided with a plurality of inwardly projecting stop lugs 74 which are arranged at suitable intervals around the inner side of the rim, as shown in Fig. 1. By this means the hands of the brakeman when gripping the rim of the hand wheel are prevented from slipping, as would otherwise be liable to occur, thereby enabling the brakeman to apply and release the brakes with certainty even though the grip of a hand on the rim is not perfectly tight.

In the past it has been the habit of some brakemen to turn the hand wheel by applying pressure of the hand to the trailing side of the spokes of the hand wheel for turning the same in the direction which would apply the brake mechanism, and when this is done the brakes are operated less effectively owing to the reduced leverage under which the pressure is applied to the hand wheel. In order to prevent the brakeman from thus applying hand pressure to the spokes of the hand wheel the rear or trailing side of each of the spokes of the hand wheel is provided between the rim 67 and the guard web 72 with a projection 75 which forms an obstruction or baffle against which the brakeman cannot apply the pressure of his hand with comfort, and on the contrary this projection will render the pressure of the brakeman's hand against the trailing side of these spokes disagreeable and thus induce the brakeman to avoid turning the hand wheel in this manner.

Detent means are provided for holding the drum and associated parts against turning backwardly when the brakes are applied more or less, which detent means comprise a ratchet wheel 76 arranged on the front part of the driving shaft within the housing and preferably formed integrally with the same and the pinion 58, and a detent pawl 77 mounted within the upper part of the casing and adapted to move into and out of engagement with the teeth of said ratchet wheel. This detent is adapted to swing about a horizontal longitudinal axis and is formed on the front part of a detent shaft 78 which is journaled on the housing by engaging its reduced front and rear ends 79, 80 with alined bearing openings 81, 82 in the front and rear walls of the housing, as shown in Fig. 5. Longitudinal movement of this detent shaft is prevented by a forwardly facing shoulder 83 on the front part of this shaft engaging with the inner side of the front housing wall, and a rearwardly facing shoulder 84 on the rear part of this shaft engaging with the inner side of the rear wall of the housing, as shown in Fig. 5.

When turning the hand wheel in a clockwise direction while the pawl 77 is in engagement with the ratchet wheel 76, the nose of this pawl will trip successively over the teeth of the ratchet wheel, and at the termination of the movement of the hand wheel in this direction the pawl will engage the rear face of the respective tooth of the ratchet wheel and hold the hand wheel against anti-clockwise rotation and thus retain the brakes under such pressure as is determined by the respective turn of the hand wheel.

Improved controlling means are provided for forcibly engaging the detent pawl with the ratchet wheel if this pawl does not drop by gravity into full engagement with the teeth of the ratchet wheel, and also to forcibly disengage the detent pawl from the ratchet wheel when it is desired to permit the brake drum to turn in a direction which will unwind the brake chain therefrom and release the brake rigging.

The preferred form of these controlling means which embody the present invention are best shown in Figs. 4, 5, 7-14 and are constructed as follows:

On the underside of the detent pawl which faces the ratchet wheel the same is provided with a releasing face 85 adjacent to the rear edge of this pawl, and in front of this releasing face the pawl is provided on its underside with a reinforcing rib 86 which extends lengthwise thereof and serves to reinforce the strength of this detent and compensate for any stock which has been removed from the detent pawl in order to provide the releasing face 85 thereon.

Immediately in rear of the detent pawl the detent shaft is provided with a recess, one side of which forms a closing bearing surface 87 which faces upwardly and extends from the periphery of the detent shaft to the axis thereof, as best shown in Fig. 10. Immediately in rear of this closing bearing face 87 the detent shaft is provided with a stop face 88 of annular form for a purpose which will presently appear.

Within the upper part of the housing and between the trip shaft and the driving shaft of the brake mechanism is arranged a horizontal longitudinal trip shaft 89 which has its front and rear ends journaled in bearing openings 90, 91 formed in alinement with each other in the front and rear walls of the housing, as shown in Fig. 5, and endwise movement of this shaft is prevented by a forwardly facing annular shoulder 92 formed on the front part of this trip shaft and engaging with the inner side of the front housing wall, and a rearwardly facing shoulder 93 formed on the rear part of this trip shaft and engaging with the inner side of the rear housing wall, as shown in Fig. 5.

On the front part of this trip shaft and within the housing the same is provided with a releasing or opening cam 94 which is adapted to engage with the curved bearing face 85 of the detent and lift the same out of engagement from the teeth of the ratchet wheel for releasing the brake mechanism, as shown in Fig. 11.

For the purpose of limiting the rocking or turning movement of the trip shaft in the direction in which the detent pawl is released or disengaged from the ratchet wheel, a stop nose, lug or dog 95 is provided on the rear part of the trip shaft within the casing, which stop lug is adapted to engage with the stop face 88 on the detent shaft, as shown in Fig. 12, and thereby limit the rotation of the trip shaft in a clockwise direction, as indicated by the arrow in this figure.

The trip shaft is provided with a pawl closing finger 96 which is of curved form and adapted to engage its downwardly turned extremity with the closing bearing face 87 of the detent shaft immediately adjacent to the axis thereof and at a point within the periphery of this shaft, as shown in Fig. 10. The detent shaft, together with the pawl 77, closing bearing face 87 and stop 88 are preferably formed integrally by casting, or the same may be forged in the form of a single piece of steel, and the trip shaft may likewise be either formed integrally with the releasing cam, closing finger and stop lug by casting the same or drop forging the same of suitable metal.

When the brake mechanism is to be held in a more or less tightened position the detent pawl 77 engages with one of the teeth of the ratchet wheel, and the releasing cam and stop lug or dog are in an inoperative position, as shown in Fig. 9, while the closing finger 96 is in engagement with the closing face 87 of the detent shaft, as shown in Fig. 10.

If it is now desired to release the brake mechanism in order to let the chain drum turn in a clockwise direction and pay out the brake chain therefrom, the trip shaft is turned in a clockwise direction so that the release cam 94 will engage with the releasing face 85 on the detent pawl and disengage the latter from the teeth of the ratchet wheel, as shown in Fig. 11, the movement of the trip shaft and the pawl in this direction being limited by engagement of the stop dog or nose 95 against the peripheral stop faces 88 on the detent shaft, as shown in Fig. 12.

For the purpose of re-engaging the detent pawl with the ratchet wheel in order to prevent unwinding rotation of the drum and keep whatever brake chain may be wound thereon, the trip shaft is turned anti-clockwise whereby the releasing cam 94 is swung downwardly out of engagement from the under side of the detent pawl and permits the latter to re-engage its nose with the teeth of the ratchet wheel by gravity. If the weight of the pawl at times is not sufficient to properly re-engage the same with the ratchet wheel, as might occur if the brake mechanism has become stiff or clogged due to rust while lying dormant after a time, it is possible to forcibly engage the detent pawl with the ratchet wheel by engagement of the closing finger 96 of the trip shaft with the closing face 87 of the detent shaft during the last part of the anti-clockwise or return movement of the trip shaft, as shown in Fig. 10.

By arranging the trip shaft between the axes of the ratchet wheel and the detent shaft a very compact and strong organization is provided and one which will operate effectively for either positively disengaging the pawl from the ratchet wheel or positively re-engaging the same under all conditions. Moreover, this organization is comparatively simple in construction and not liable to get out of order under the severest use to which the same may be subjected.

The turning of the trip shaft in either direction is preferably effected by means of a hand operated trip lever 97 which is arranged between the front side of the housing and the rear side of the hand wheel, and is connected with the front end of the trip shaft. This connection between the trip shaft and the trip lever is preferably effected by means of a forwardly tapering shank 98 on the front end of the trip shaft engaging with a forwardly tapering opening 99 in the hub 100 of the trip lever 97, as shown in Figs. 1, 5, 8 and 13, the front end of the shank 98 being upset slightly after the hub 100 is applied thereto in order to prevent disengagement of these parts.

The trip lever and trip shaft are compelled to turn together by so constructing the cooperating faces of the trip shaft shank and trip lever hub in cross section of angular irregular form and this irregular form is preferably so designed that it is unsymmetrical, and the trip lever and trip shaft shank can only be assembled in one position so that the trip lever when applied to the trip shaft will always occupy a definite position with reference to the releasing cam, closing finger and stop dog on the trip lever. For this purpose the bore or axle opening of the trip lever is preferably made of square form in cross section, as indicated at 101 with the exception that one corner is filled in, as shown at 102, and the shank of the trip lever is made of corresponding form, as shown in Fig. 13, thereby permitting of assembling these parts in only one position relative to each other and insuring location of the trip lever relative to the parts mounted on the trip shaft in the required position.

When the detent pawl is in its lowered operative position and in engagement with the ratchet wheel the trip lever projects outwardly from the ratchet wheel and adjacent parts, and toward the longitudinal side of the car, and assumes an inclined pendant position to a substantial extent below a horizontal line extending through the axis of the trip shaft, as shown by full lines in Fig. 1, and by dotted lines in Figs. 9 and 10. Upon raising this trip lever preparatory to releasing the detent pawl from the ratchet wheel this lever moves idly from its downwardly inclined pendant position to an upright position indicated by line 19 in Figs. 1–12, which is nearly up to a vertical line extending through the axis of the trip shaft. At this point the release cam 94 of the trip shaft begins its engagement with the releasing surface 85 of the detent pawl, and upon now continuing to turn the trip lever from a position indicated by line 19 to a position somewhat at the right of this vertical line; which last-mentioned position is indicated by dotted lines in Fig. 11, the lifting cam 94 will effect the operative portion of its rotary movement and cause the detent pawl to be lifted out of engagement from the ratchet wheel, as shown by full lines in Fig. 11. Thereafter, movement of the trip lever in this direction continues which is clockwise and no further releasing effect of the cam 94 upon the detent pawl 77 occurs, and at the end of such idle movement of the trip lever in a clockwise direction the same turns to a greater extent from a vertical position to an inclined position to the right of its axis until it reaches the extreme inclined position toward the right which is indicated by dotted lines in Fig. 12, due to the engagement of the stop lug 95 with the stop face 88 on the detent shaft.

Due to the fact that the initial or retracted position of the trip lever necessitates first raising the trip lever from its outwardly inclined position and then pushing the same inwardly over the axis thereof, the brakeman is obliged to go through a form of motion with his hands which will compel him to exert pressure inwardly relative to the car and thereby insure greater safety for the brakeman inasmuch as he is not liable, while going through these motions, to accidentally throw himself off the car due to slippage of his hands or breakage of any parts, as would be the case if the brakeman were exerting a pull upon the hand lever outwardly and toward the longitudinal side of the car while releasing the brake mechanism, inasmuch as at such times the slippage of the brakeman's hands on the trip lever or the breaking of the same might cause the brakeman to fall sideways from the car and thus cause possible injury.

By placing the detent mechanism and the mechanism for controlling the same on the left hand side of the housing the brakeman while operating the control mechanism either for disengaging the detent pawl from the ratchet wheel or re-engaging the same therewith, is not obliged to reach over the control mechanism and possibly get his clothing caught on the hand wheel while the same is whirling for releasing the brake and thus sustain injury, but instead the trip lever in the present control mechanism is located nearer to his natural standing position and the hand wheel is therefore not liable to catch the clothing of the brakeman, thereby insuring safety in the operation of this brake mechanism.

From the foregoing it will be evident that the initial part of the upward movement of the trip lever is idle and that during the intermediate part of the same while passing, the vertical center operates to quickly disengage the detent pawl from the teeth of the ratchet wheel and thereby eliminates the possibility of the nose or point of the detent pawl from being sheared off by the tips of the ratchet teeth as would be liable to occur if disengagement of the detent pawl from the ratchet teeth was effected slowly.

By normally arranging the trip lever in its fully retracted position so that it inclines below the horizontal any severe shock to which the car may be subjected while the brakes are applied and the same is being coupled with another car, will not be able to throw the trip lever upwardly during such a shock a sufficient extent to cause the trip lever to be thrown across the vertical center, thereby preventing the releasing cam 94 from operatively engaging the detent pawl and accidentally disengaging the latter from the ratchet wheel, whereby serious accidents which otherwise would result from such unintentional disengagement of the detent pawl are prevented.

When taking out the slack in the brake chain the hand wheel is turned rapidly in a clockwise direction, during which time the detent pawl is lifted and trips successively over the tips of the several ratchet teeth. By engaging the tip of the closing finger 96 with the bearing face 87 of the detent shaft close to the axis of the latter, the extent of circumferential movement at the point of contact between the bearing face 87 and the closing finger 96 is reduced to a minimum so that practically no vibration is imparted at this time by the detent pawl to the trip lever, and no tendency exists for the pawl while thus riding over the tips of the ratchet wheel teeth to throw the trip lever forwardly to such an extent that the releasing cam 94 would actually lift the detent pawl, and thereby prevent the same from being ready to catch the ratchet wheel against unwinding motion after winding up of the brake chain on the brake drum has been completed for setting the brakes at the desired pressure.

We claim:

A holding and releasing mechanism for railway car hand brakes including a ratchet wheel, a detent pawl engaging said ratchet wheel, a pawl shaft carrying said pawl and having a radial bearing face adjacent to the axis of the pawl shaft and a peripheral stop face, and a trip shaft having its axis parallel with the axes of said pawl and ratchet wheel and having a releasing cam adapted to engage said pawl for disengaging the same from said ratchet wheel upon turning the trip shaft in one direction, a closing finger adapted to engage said bearing face and press the pawl into engagement with the ratchet wheel upon turning the trip shaft in the opposite direction, and also having a stop dog adapted to engage said stop face for limiting the pawl releasing movement of said trip shaft.

FRANK D. MILLER.
EVERARD C. MERSEREAU.